Dec. 22, 1931.  G. F. WIKLE  1,837,351
TIRE BUILDING MACHINE
Filed Jan. 23, 1929
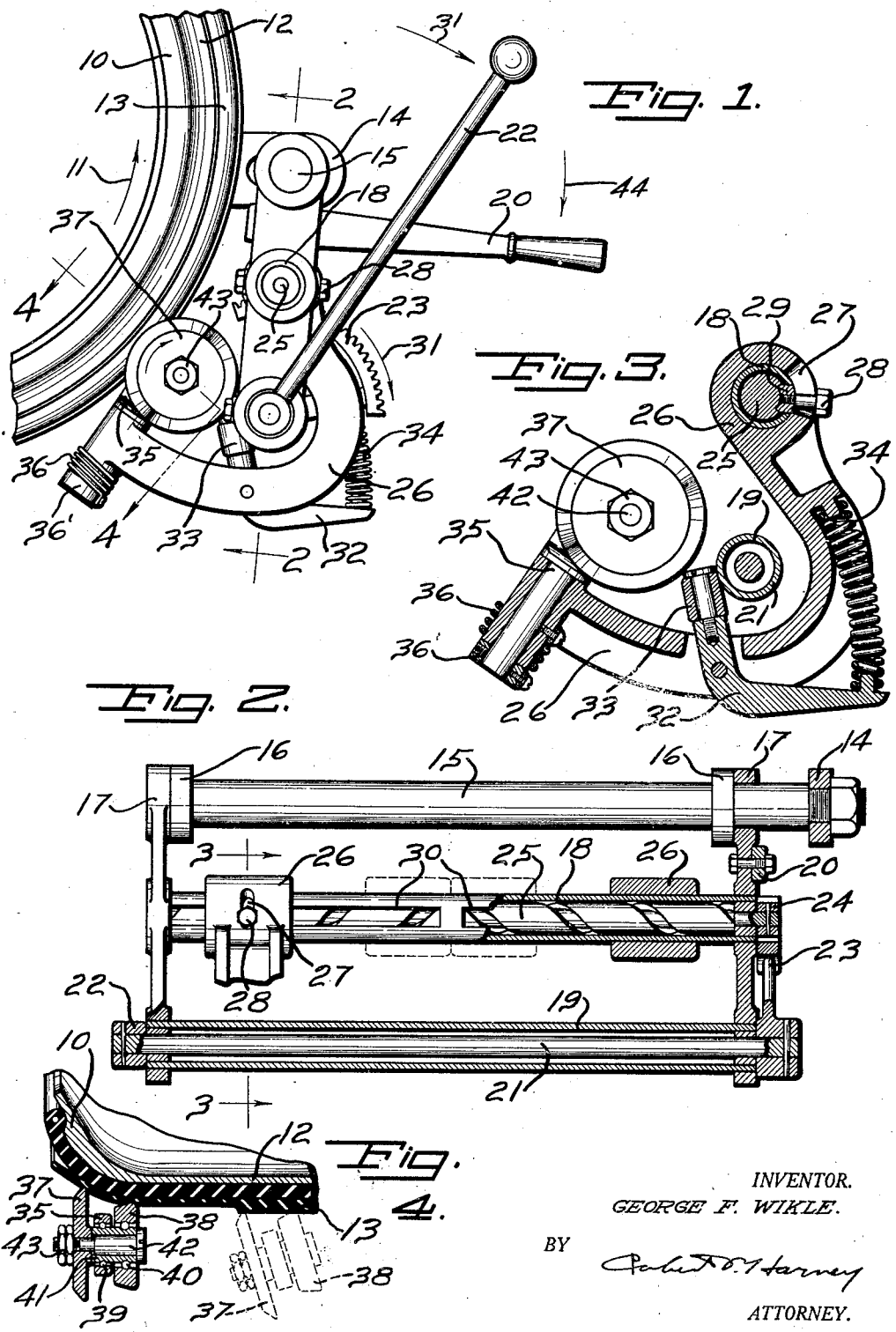
INVENTOR.
GEORGE F. WIKLE.
BY
ATTORNEY.

Patented Dec. 22, 1931

1,837,351

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE BUILDING MACHINE

Application filed January 23, 1929. Serial No. 334,444.

My invention relates to machines for the fabrication of pneumatic tires and more particularly to a device for stitching together on a building drum or core the carcass plies, sidewalls, chafing strips, tread, etc., to produce a pneumatic tire carcass ready for vulcanization.

It is among the objects of my invention to provide a stitching device which is constantly within control of the operator and also a stitching device which will exert a uniform pressure regardless of the irregularities of the building drum. Another object is to provide a stitching roll which will automatically maintain, within certain limits, a predetermined stitching angle irrespective of the contour of the building drum. Other objects will be apparent from the specification and claims.

In the drawings illustrating one embodiment of my invention,

Fig. 1 is a side view of my invention shown in operative position;

Fig. 2 is a sectional view taken substantially on the line 2—2 of Fig. 1;

Fig. 3 is a sectional view taken substantially on the line 3—3 of Fig. 2; and

Fig. 4 is a sectional view taken on the line 4—4 of Fig. 1.

In the drawings 10 represents a tire building drum or former adapted to be rotated in the direction of the arrow 11 shown in Fig. 1 upon which is built a tire carcass 12, the tread portion 13 of which is being stitched down. A bracket 14 (Fig. 1), which is attached to the drum support not shown, is adapted to position a shaft 15 into a predetermined position in respect to the building drum 10. Pivotally positioned by collars 16 on shaft 15 (see Fig. 2) are two side members 17 which are in turn assembled to two hollow shafts 18 and 19. A handle 20 is attached to one of the side members 17 to enable the hollow shafts 18 and 19 and side members 17 to be pivoted as a unit on shaft 15. Rotatably positioned in hollow shaft 19 is a shaft 21 to which is pinned at one end a handle 22 and at the other a gear segment 23. Meshing with the gear segment 23 is a pinion 24 which is pinned to a reversely threaded shaft 25 rotatably positioned in hollow shaft 18. Slidably mounted on shaft 18 are two brackets 26 in which are formed slots 27 engaging bolts 28 in nuts 29. The hollow shaft 18 has slots 30 and the nuts 29 engage in these slots and also engage the reversely threaded shaft 25. It will be evident from the foregoing that as the handle 22 is rotated in the direction of the arrow 31 (Fig. 1) the reversely threaded shaft 25 will, through the action of gear segment 23 and pinion 24, be rotated thus sliding the brackets 26 from the dotted line position in Fig. 2 to the full line position and this action may be reversed by rotating the handle 22 in the opposite direction.

The brackets 26 are formed U-shaped as shown in Fig. 3 and pivotally support bell cranks 32, on one arm of which are rollers 33 engaging the hollow shaft 19 while compression springs 34 are positioned to engage between the other arm of the bell cranks 32 and the brackets 26 as shown in Fig. 3. Swivel stitcher mountings 35 are mounted in the brackets 26 with springs 36 acting on collars 36' attached to the swivel stitcher mountings 35 to return the latter, when inoperative, to a predetermined rest position. Stitching rolls 37 and 38 are mounted in the swivel stitcher mountings 35 (Fig. 4) by ball bearings 39 and 40 having common raceways 41 which are bolted to the stitcher rolls 37 by bolts 42 and lock nuts 43. As will be readily seen from Fig. 4, this assembly permits the stitching rolls 37 to rotate independently of the stitching rolls 38 to compensate for their different rotating speeds which result from the different diameters. This difference in diameters is an important part of my invention for by simply adjusting the diameters of the stitching rolls they may be made to stitch at the most efficient angle with respect to the surface of the building drum.

When the stitchers are on the flat part of the core their shafts are in the same plane as the shaft of the core but are at an angle to the shaft of the core so that the stitchers tend to push the fabric away from the center of the core due to the angle of the stitcher with the face of the core. However, as soon as the stitchers start around the corner of the core it is desirable to increase the push of the stitcher because the cords of the fabric must be forced together due to the decreasing diameter. This is accomplished in two ways. First, the angle of the stitcher to the face of the core is decreased due to the curvature of the face. Then due to the fact that the center line of shaft 35 is not parallel to a tangent thru the point of contact of the stitcher with he carcass but is at an angle away from it on the side from which the core is rotating, the forward part of the stitcher is pressed harder against the carcass and thus pushes the fabric around the curvature of the core. This push tends to increase as the stitcher rotates on shaft 35 but tends to decrease as the whole stitcher rotates on shaft 15 so that by the time the stitcher wheel passes around the bead the drag is not enough to wrinkle the stock. This last condition is determined by the distance of shaft 15 from the core shaft.

The operation of the whole machine is as follows. The operator presses the handle 20, as indicated by the arrow 44 (Fig. 1), to pivot the whole assembly on the shaft 15 to bring the stitching rolls 37 into contact with the portion of the tire carcass which is to be stitched. The spring 36 will then yield to allow the stitching rolls 38 to come into contact with the carcass and to also establish the predetermined stitching angle. A further depression of the handle 20 will cause the brackets 26 to pivot on the hollow shaft 18 and, through the action of the bell cranks 32, compress the springs 34 thus providing a yieldable pressure on the stitching rolls, the force of which may be governed by the pressure on handle 20. In actual practice the tire building drums seldom run true and a yieldable pressure on the stitching rolls is necessarily demanded for the proper stitching action and also in my invention this yieldable pressure is used to maintain at all times a substantially equal pressure on each set of stitching rolls. After the proper pressure has been applied the handle 31 is rotated to move the stitcher rolls as shown in Fig. 4 to perform the stitching operation.

Having thus described my invention, I claim:

1. A device of the character described comprising a frame pivoted adjacent a tire building drum, a shaft forming part of said frame, a pair of stitcher supporting brackets pivotally and slidably mounted on said shaft, a handle forming part of said frame by means of which the latter may be swung on its pivot to press stitchers supported by the stitcher supporting brackets against a tire carcass on the building drum, means supported by the stitcher supporting brackets to allow the latter to pivot on the shaft with a yieldable pressure and means to simultaneously move the brackets toward and from each other on the shaft.

2. A device of the character described comprising a frame pivotally mounted adjacent a tire building drum, a slotted hollow shaft forming part of said frame, a reversely threaded shaft rotatably mounted in the hollow shaft, brackets pivotally and slidably mounted on the hollow shaft, means associated with the brackets to engage in the slots of the hollow shaft and also the reversely threaded shaft, means supported on the frame to rotate the reversely threaded shaft to move the brackets toward and from each other on the shaft, means supported by the brackets to permit the latter to be pivoted on the hollow shaft with a yieldable pressure swivel mounting on the brackets supporting stitching rolls and means associated with the frame to swing the latter about its pivot to bring the stitching roll against a tire carcass on the building drum.

3. A device of the character described comprising a support adapted to be positioned adjacent a tire building drum, a shaft swivel mounted in said support, a stitching device carried by said shaft and comprising a pair of independently rotatable stitching rolls, of different diameters, held in a fixed spaced relation to each other, the swivel mounting of said shaft permitting both rolls to simultaneously engage the surface to be operated upon at an angle predetermined by the difference in diameters of the rolls.

4. A device as in claim 3 wherein said shaft is positioned in the plane of rotation of the drum but at an angle to the tangent to the drum passing through the point of contact of the roll with the drum, and means to vary said angle.

GEORGE F. WIKLE.